United States Patent [19]
Currie

[11] Patent Number: 5,974,433
[45] Date of Patent: Oct. 26, 1999

[54] HIGH SPEED M-SEQUENCE GENERATOR AND DECODER CIRCUIT

[76] Inventor: Robert John Currie, 2919 Sweet Basil Cir., Salt Lake City, Utah 84118

[21] Appl. No.: 06/626,127

[22] Filed: Jun. 29, 1984

[51] Int. Cl.[6] ........................................... H04R 3/00
[52] U.S. Cl. ............................................. 708/252
[58] Field of Search ...................... 364/717; 178/22.19; 375/1, 115; 370/18; 358/717.01; 708/250–256

[56] References Cited

U.S. PATENT DOCUMENTS

| | | | |
|---|---|---|---|
| 3,988,538 | 10/1976 | Patton | 178/22.19 |
| 4,122,393 | 10/1978 | Gordy et al. | 375/115 |
| 4,213,101 | 7/1980 | Policand et al. | 364/717 |
| 4,450,321 | 5/1984 | Quigley et al. | 178/22.19 |
| 4,455,651 | 6/1984 | Baran | 370/18 |
| 4,543,657 | 9/1985 | Wilkinson | 375/115 |
| 4,559,633 | 12/1985 | Kan et al. | 375/1 |

*Primary Examiner*—Salvatore Cangialosi
*Attorney, Agent, or Firm*—Perman & Green, LLP

[57] ABSTRACT

This circuit permits M-sequence signals to be generated and decoded very fast while using relatively low power, low speed circuitry components.

2 Claims, 2 Drawing Sheets

HIGH SPEED M-SEQUENCE GENERATOR AND DECODER CIRCUIT

BACKGROUND

1. Field of the Invention

This invention is directed to a circuit for generating and decoding sequences of signals, in general, and to the high speed generation and decoding of M-sequence signals, in particular, while using relatively slow circuit components.

2. Prior Art

There are many instances where particular sequences of signals, referred to as M-sequence signals, are required. In typical applications, the M-sequence signals are used in spread spectrum techniques to provide randomization of the data which is to be transmitted. This type of operation reduces the risk of interception and understanding of the transmitted data by unauthorized receivers. Also, the code sequence may be utilized to prevent loss of intelligible information due to jamming. Moreover, an M-sequence circuit guarantees a large number of signal transitions, e.g. binary 1's to binary 0's and vice versa.

These techniques have been used for some time and circuits for generating the sequences, encoding the sequences and/or decoding the sequences are known in the art. However, one of the problems with M-sequence signal generation for spread spectrum communication is that the sequence must be generated at very high signal rates. This tends to be difficult and costly with today's technology. That is, the circuit components which are presently available are relatively slow in operation, even though the circuits can operate in the near megahertz (MHz) range. However, in many instances it is necessary and/or desirable to operate the M-sequence generating circuitry of the type described herein in the gigahertz (GHz) range. Unfortunately, the technology currently available is unable to perform this high speed operation economically.

While it is possible and, perhaps, likely that future technology will become available to operate in this speed range, alternative approaches must be designed at this time to permit the gigahertz range of operation with the megahertz range equipment. The invention described hereinafter accomplishes this operational capability.

SUMMARY OF THE INVENTION

The system shown and described herein includes sequence generating circuits which are connected to a multiplexing network. The multiplexing network is connected to a high speed output circuit. The multiplexing network, and the sequence generating circuits are connected to and controlled by a clocking network which prescribes a gigahertz operation at the ultimate output while utilizing a relatively low megahertz operation at the circuit level.

DESCRIPTION OF THE PREFERRED EMBODIMENT

Figure 1:
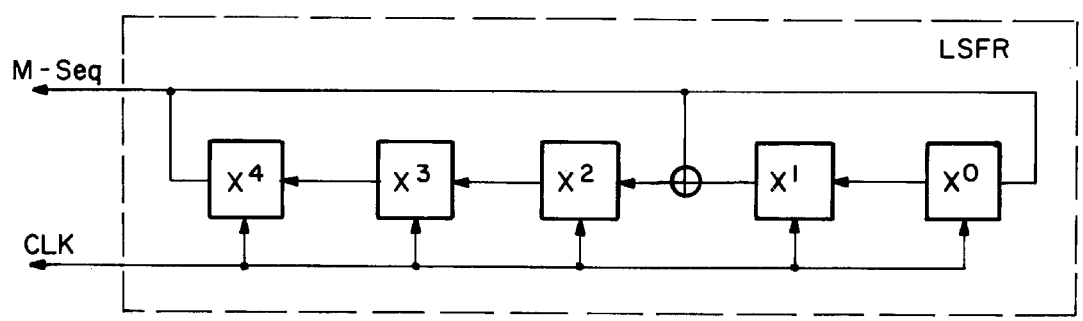
FIG. 1 is a block diagram of a representative linear feedback shift register used in the instant invention.

Referring now to FIG. 1, there is shown a linear feedback shift register (LFSR) of length n and which is wired to represent a primitive polynomial g(x) over $GF(2^n)$. In particular, each of the blocks represents a flip-flop or similar storage element which stores information therein, typically in a binary form. The information stored in the respective blocks represents the value (or bit) of that portion of the expression or polynomial which has been selected.

For illustrative purposes, it is assumed that the polynomial is given as $g(x)=x^5+x+1$. In this instance, n=5 wherein the M-sequence produces a signal sequence having the length of M=31. Actually, 32 states are permitted but the zero state is not useful and is discarded. The LFSR in FIG. 1 is connected to represent the polynomial discussed above.

This LFSR is arranged to be initially loaded in any of the 31 non-zero states. This is done by supplying signals thereto in a conventional fashion. The LFSR is then cycled through all of the 31 states which are available by application of the clock signal CLK. The contents of the $x^4$ stage of the LFSR are detected on the output line as the M-sequence.

It is clear, however, that this approach is greatly speed limited inasmuch as the generator produces only 1 bit of the M-sequence per clock cycle. Therefore, in order to increase the speed of operation, it would be necessary and/or desirable to generate k bits per clock cycle (where k is greater than 1). One way to accomplish this is to use a higher speed combining or commutating logic. This technique can be accomplished by using k LFSR's which are wired so as to generate the (j+k)th state of the original LFSR state sequence (where $j=0, 1, 2 \ldots 2^{n-2}$). When this technique is utilized, the k registers are loaded, in the usual fashion, with k successive states of the original register and then allowed to operate in free-running operation.

In the example given, the polynomial $g(x)=x^5+x^2+1$ is solved for the primitive element α. This produces the equation $$\alpha^5+\alpha^2+1=0$$

From this general relationship, the field elements can be obtained by generating the powers of α as shown in Table 1. The corresponding binary representation shown in Table 1 is precisely the sequence of states exhibited by the LFSR during the operation thereof.

TABLE 1

NON-ZERO ELEMENTS OF $GF(2^5)$ FOR $g(x) = x^5 + x^2 + 1$

| EXP | 4 | 3 | 2 | 1 | BINARY |
|---|---|---|---|---|---|
| 0 = |   |   |   | * | 00001 |
| 1 = |   |   | * |   | 00010 |
| 2 = |   |   | * |   | 00100 |
| 3 = |   | * |   |   | 01000 |
| 4 = | * |   |   |   | 10000 |
| 5 = |   |   | * | * | 00101 |
| 6 = |   | * |   | * | 01010 |
| 7 = | * |   | * |   | 10100 |
| 8 = |   | * | * |   | * | 01101 |
| 9 = | * | * |   | * | 11010 |
| 10 = | * |   |   | * | 10001 |
| 11 = |   |   | * | * | 00111 |
| 12 = |   | * | * | * | 01110 |
| 13 = | * | * | * |   | 11100 |
| 14 = | * | * |   | * | 11101 |
| 15 = | * | * | * | * | * | 11111 |
| 16 = | * | * |   | * | * | 11011 |
| 17 = | * |   |   | * | * | 10011 |
| 18 = |   |   | * | * | 00011 |
| 19 = |   |   | * | * |   | 00110 |

TABLE 1-continued

NON-ZERO ELEMENTS OF $GF(2^5)$ FOR $g(x) = x^5 + x^2 + 1$

| | EQUATION TERM | | | | |
|---|---|---|---|---|---|
| EXP | 4 | 3 | 2 | 1 | BINARY |
| 20 = | | * | * | | 0 1 1 0 0 |
| 21 = | * | * | | | 1 1 0 0 0 |
| 22 = | * | | * | * | 1 0 1 0 1 |
| 23 = | | * | * | * | 0 1 1 1 1 |
| 24 = | * | * | * | * | 1 1 1 1 0 |
| 25 = | * | * | | * | 1 1 0 0 1 |
| 26 = | * | | * | * | 1 0 1 1 1 |
| 27 = | | * | * | * | 0 1 0 1 1 |
| 28 = | * | | * | * | 1 0 1 1 0 |
| 29 = | | * | | * | 0 1 0 0 1 |
| 30 = | * | | * | | 1 0 0 1 0 |
| 31 = 0 = | | | | * | 0 0 0 0 1 |

NOTE:
ASTERISK (*) SIGNIFIES THE PRESENCE OF THE TERM IN EQUATION.

If the value k=4 is selected to indicate that four bits of the sequence are to be generated for each clock period, four LFSR's are required to generate the field value $\alpha^{j+4}$ where j=0, 1, . . . , 30. Each of the LFSR's is loaded with any element $\alpha^i$, $\alpha^{i+1}$, $\alpha^{i+2}$, and $\alpha^{i+3}$. It will be seen that for i=0, Table 2 illustrates the contents of each of the respective registers for successive clock cycles. For simplification purposes, only the exponent values associated with $\alpha$ are listed in Table 2. For example, the numeral 4 in row LFSR0 and column $t_1$ represents the contents $\alpha^4$ of LFSR at time $t_1$.

TABLE 2

CONTENTS AT SPECIFIED TIME

| | $t_0$ | $t_1$ | $t_2$ | $t_3$ | $t_4$ | $t_5$ | $t_6$ | $t_7$ | $t_8$ |
|---|---|---|---|---|---|---|---|---|---|
| LFSR 0 | 0 | 4 | 8 | 12 | 16 | 20 | 24 | 28 | 1 |
| LFSR 1 | 1 | 5 | 9 | 13 | 17 | 21 | 25 | 29 | 2 |
| LFSR 2 | 2 | 6 | 10 | 14 | 18 | 22 | 26 | 30 | 3 |
| LFSR 3 | 3 | 7 | 11 | 15 | 19 | 23 | 27 | 0 | 4 |

NOTE:
NUMERALS REPRESENT THE EXPONENTS FOR .

It can also be seen from Table 2 that, at time period t0, the register LFSR0 stores the value $\alpha^0$. Again, at time period t7 register LFSR3 stores $\alpha^0$. This situation occurs inasmuch as each of the LFSR's will generate all 31 elements, by steps of four, and then start over. However, it must be noted that each of the LFSR's will start in a condition where it is offset, by one, from the next adjacent LFSR.

Figure 2:
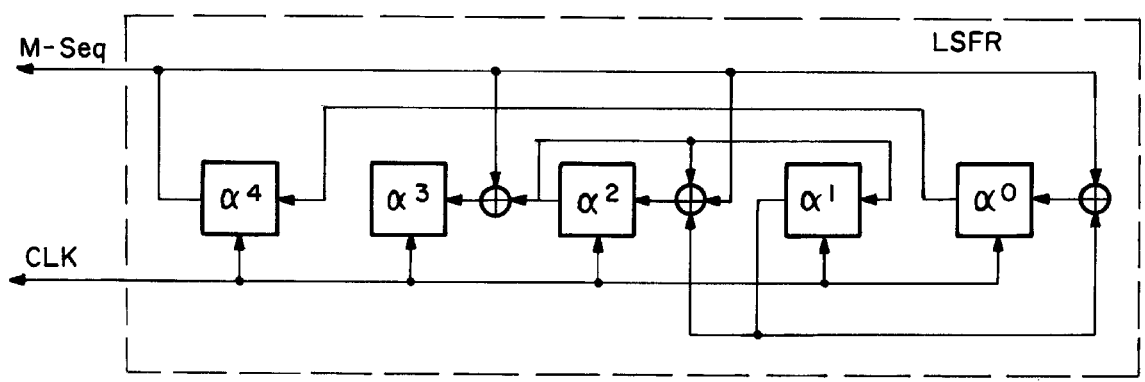
FIG. 2 is a block diagram of another linear feedback shift register which can be used with the instant invention.

In order to obtain the M-sequence, the four LFSR's are sampled, in order, for T/4 or one-fourth the time cycle. This sampling can be performed in any desired fashion. However, it must be determined as to how the LFSR's are to be arranged inasmuch as stepping by 4 is required. In this embodiment, stepping by 4 is equivalent to multiplying by $\alpha^4$ and obtaining the appropriate coefficients. After solving the mathematics, the LFSR circuit shown in FIG. 2 is found to provide the multiplication by $\alpha^4$ for the field generated by $g(x)=x^5+x^2+1$.

Figure 3:
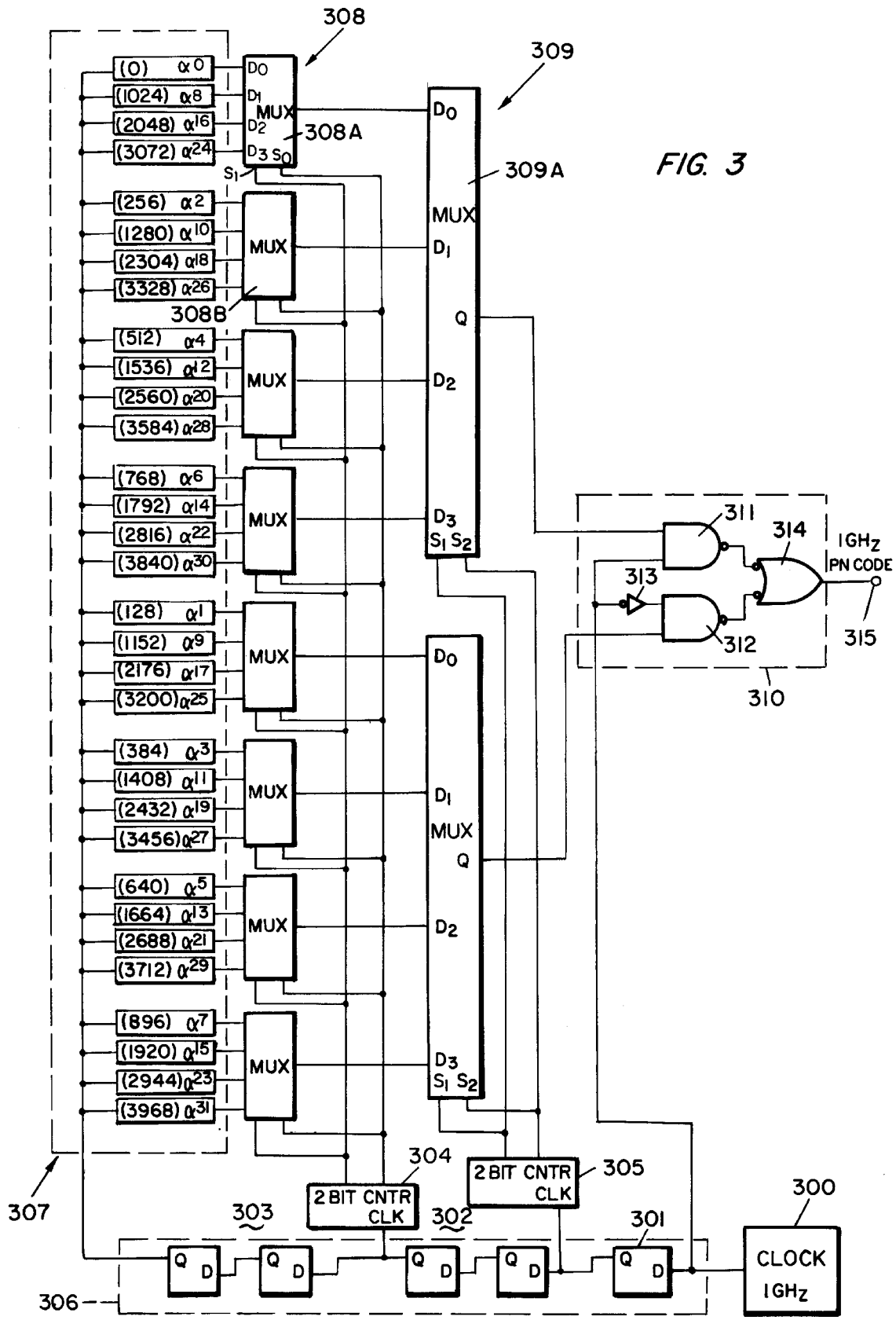
FIG. 3 is a block diagram of the system which forms the instant invention.

Referring now to FIG. 3, there is shown a schematic block diagram representation of a circuit which will generate a pseudo noise (PN) signal at a rate of 1 GHz using standard, existing circuitry. In particular, CMOS code generators are provided for this device. In a typical embodiment, the multiplexer circuits used 100K ECL and/or F380 devices. In the alternative, a Fairchild 2000 gate array capable of operating at approximately 500 MHz can be used.

In the high speed code generator shown in FIG. 3, it is desired to operate the system at the one gigahertz rate. To accomplish this, a clock circuit 300 provides a clock signal at the one gigahertz rate. This signal is supplied to gating apparatus 310 and to the clock (or down-counting) circuit 306. In particular, the one gigahertz clock signal is supplied to an input of inverter 313 and to one input of Nand gate 311. The output of inverter 313 is supplied to one input of Nand gate 312. The other input of gate 311 is connected to the output of multiplexer 309A while the other input of gate 312 is connected to MUX 309B. The outputs of gates 311 and 312 are connected to respective inputs of gate 314. The output terminal of Nand gate 314 is connected to the output terminal 315 at which terminal the PN code appears at the one gigahertz (1 GHz) rate as described hereinafter.

The clock signal from clock circuit 300 is provided to a suitable counter device such as a flip-flop 301 which forms part of a down counter 306. Typically, circuit 301 can be a D-type flip-flop wherein the signal at the Q output terminal is similar to the input signal except that it is provided at one-half the input frequency. Thus, counter circuit 301 supplies a signal at approximately 500 MHz to the clock input of a two-bit-counter 305 and to the D input terminal of counter network 302. Network 302 comprises, in a typical example, a pair of D-type flip-flops connected in series so that the output signal produced at the Q terminal of the second flip flop is the same as the input signal supplied thereto, except that the frequency thereof is divided by 4. Consequently, circuit 302 produces an output signal on the order of 125 megahertz which is supplied to the clock input terminal of a two-bit-counter 304 and to the D input terminal of counter circuit 303. Counter circuit 303 is similar to circuit 302 in that it effectively divides the input signal frequency by 4 and produces an output signal of 31.25 megahertz which signal is supplied to the clock terminal of all of the LFSR's 307 (i.e. LFSR 307A and all of the other LFSR's).

The LFSR's are arranged in groups of four and the output terminals of each LFSR in a group are connected to one of the four-way multiplexers 308. The multiplexer 308 also receives output signals from the two-bit-counter 304. The multiplexers are arranged to step or shift through four transmission arrangements. Thus, in accordance with the signals supplied by counter 304, MUX 308A will transfer the contents of LFSR 307A, 307B, 307C, or 307D to the output terminal of the MUX.

In similar fashion, the output terminals of the multiplexers 308 are connected to input terminals of multiplexers 309 in groups of four. Also, multiplexers 309 receive output signals from the two-bit-counter 305 whereby the input signals to multiplexers 309 (MUX 309A or 309B) are successively accessed and passed through to the output terminals thereof. The output terminals of multiplexers 309 are connected to the respective inputs of Nand gates 311 and 312 as noted above. The one gigahertz clock signal from clock generator 300 is also applied to the gate network 310.

In operation, the LFSR's are loaded with the appropriate contents. In the general case, the contents are represented by the reference character $\alpha^0$, $\alpha^1$, and so forth. The clock generator 300 is then rendered operative to provide signals to the circuit. The down counter circuit 306 effectively supplies signals at a rate of approx-imately 31.25 megahertz to the LFSR's 307. These registers are then clocked at this rate which is, in sophisticated electronic equipment, relatively slow. This type of circuitry is readily available on the market. At the same time, the multiplexers 308 are selectively operated in accordance with the signals from counter 304. That is, the multiplexers selectively pass signals from the LSFR's, one at a time. The multiplexers are, effectively, switched at 125 megahertz. However, the LFSR's connected thereto are operated at the lower rate. In essence then, the LFSR's are switched at the low rate and are thereby permitted to, effectively, settle down and supply the signals to the MUX 308. The MUX 308 then switches at the 125 megahertz rate which it is quite capable of doing. In essence then, the signals from these LFSR's are transferred at the 125 megahertz rate.

In similar fashion, the outputs of the MUX 308 are supplied to MUX 309 at the 125 megahertz rate. The MUX 309 is activated by counter 305 which is equivalent to a 500 megahertz rate. In essence then, the MUX 309 produces output signals at the 500 megahertz rate, which it is capable of doing.

The signals from MUX 309 are then supplied to gating circuit 310 at the effective rate of 500 megahertz. Gate 310 logic remains the same. For n=12 and m=5, typical values of exponents only are displayed in parenthesis in the respective LFSR's in FIG. 3. For example, $\alpha^{0 \cdot 2^7} = \alpha^0$; $\alpha^{1 \cdot 2^7} = \alpha^{128}$; $\alpha^{2 \cdot 2^7} = \alpha^{256}$, and so forth. For these examples, the exponent values are 0, 128, 256, and so forth, which are shown in the LFSR's. These values are, of course, not limitative of the invention, per se.

Reference is made to Table 3 for a demonstration of the operation described above. There it will be seen that the sequence generated by four LFSR's is the same as the sequence generated by one LFSR with an initial shift of 12 bit positions. Thereafter, the sequences are identical.

EXAMPLE: n=5, m=2 NOTE: NUMERALS REPRESENT EXPONENTS FOR $\alpha$.

TABLE 3

|  | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
|---|---|---|---|---|---|---|---|---|---|---|---|---|---|---|---|---|
| LFSR 0 | 0 | 1 | 2 | 3 | 4 | 5 | 6 | 7 | 8 | 9 | 10 | 11 | 12 | 13 | 14 | 15 |
| LFSR 1 | 8 | 9 | 10 | 11 | 12 | 13 | 14 | 15 | 16 | 17 | 18 | 19 | 20 | 21 | 22 | 23 |
| LFSR 2 | 16 | 17 | 18 | 19 | 20 | 21 | 22 | 23 | 24 | 25 | 26 | 27 | 28 | 29 | 0 | 1 |
| LFSR 3 | 24 | 25 | 26 | 27 | 28 | 29 | 0 | 1 | 2 | 3 | 4 | 5 | 6 | 7 | 8 | 9 |

Position:  0 0 0 0 0 0 0 0 0 1 1 1 1 1 1 1 1 1 1 2 2 2 2 2 2 2 2 2 2 3 3
         1 2 3 4 5 6 7 8 9 0 1 2 3 4 5 6 7 8 9 0 1 2 3 4 5 6 7 8 9 0 1

Sequence generated by one LFSR:

0 0 0 0 1 0 0 1 0 1 1 0 0 1 1 1 1 1 0 0 0 1 1 0 1 1 1 0 1 0 1
↑

Sequence generated by 4 LFSR's, as above:

0 0 1 1 0 1 1 1 0 1 0 1 0 0 0 0 1 0 0 1 0 1 1 0 0 1 1 1 1 1 0
↑
↑ = START OF IDENTICAL CYCLES is of a particulr design such as is now available using gallium arsenide (GaAs) circuitry which is capable of operating at these or even greater speeds. By supplying the one gigahertz signal to gating circuit 310, and because of the inclusion of inverter 313, gates 311 and 312 are mutually exclusively operable. Consequently, the signals from multiplexer 309A or 309B are selectively passed through gates 311 or 312, respectively, to the inputs of gate 314. Inasmuch as the clocking of gate 310 is produced at the one gigahertz rate, the output signals supplied at output terminal 313 are also produced at the one gigahertz rate.

The previously described system generates a sequence at a rate kR, where k is any integer. If, on the other hand, k=$2^m$, where m is an integer, a simpler scheme can be used. For the general case (k=any integer), k LFSR's are connected to multiply the generator polynomial g(x) by $\alpha^k$. This will usually require interstage mod 2 adders with more than two inputs which impose more hardware and cause increased signal transmission delay. However, when k=$2^m$, the k LFSR's can be wired for g(x) which eliminates the problem of more than two inputs on interstage adders, but the biggest savings can be made in the code acquisition hardware. That is, only one LFSR, running at rate R, is necessary, rather than the k LFSR's required for the general case.

This simplification can be accomplished because of the following property of M-sequences. Sampling an M-sequence at a rate of $2^{-m}$ (where m=an integer) times the sequence rate yields the same sequence, only shifted. In this case, the $2^m$ LFSR's are wired for g(x). Then, to generate a sequence of $2^{n-1}$, for n>m, the registers are pre-loaded with $\alpha^0, \alpha^{2^{(n-m)}}, \alpha^{2 \cdot 2^{(n-m)}}, \alpha^{3 \cdot 2^{(n-m)}} \ldots \alpha^{(n-1) \cdot 2^{(n-m)}}$. The combining Thus, there is shown and described a circuit which is useful in creating relatively high frequency output signals by circuitry comprised primarily of low frequency components. The circuit uses a number of registers which produce particular types of signals in accordance with a special code scheme. These signals are then passed through multiplexing circuits which permit a kind of time-shared sampling wherein relatively higher signal rate is achieved at the outputs thereof. The output gating circuit operates at very high frequencies and signal rates. However, this type of circuitry is not generally available in all types of circuits and is expensive as well. Consequently, it is highly desirable to provide the higher signal rate with existing, relatively low-power, relatively inexpensive circuitry. In the above description, specific types of codes, registers and the like have been referred to. Those skilled in the art may conceive of modifications to any of these described elements. However, any such modifications which fall within the purview of this description are intended to be included therein as well. The description is intended to be illustrative only and not to be limitative. Rather, the scope of the invention is determined only by the claims appended hereto.

I claim:

1. A M-sequence code generator comprising,
   a plurality of linear feedback shift registers for generating pseudo-random signals,
   multiplexer means coupled to said registers for receiving said signals and for transmitting said signals therethrough in a multiplexed manner,
   gate means coupled to the output of said multiplexer means, for receiving said signals from said multiplexer means, and clock means coupled to supply a low frequency clock to said register means, a high frequency clock to said gate means and at least one intermediate frequency clock to said multiplexer means.

2. A M-sequence code generator as claimed in claim 1 wherein said multiplexer means comprises a plurality of multiplexer elements coupled together, and some of said elements are arranged in a first rank which receives said signals from said register means and others of said multiplexer elements are connected in a second rank which receives said signals from said first rank and supplies said signals to said gate means, and said clock means supplies said elements of said first rank with a first intermediate frequency clock and said elements of said second rank with a second intermediate frequency of a higher frequency than said first intermediate frequency clock.

* * * * *